Patented Mar. 23, 1954

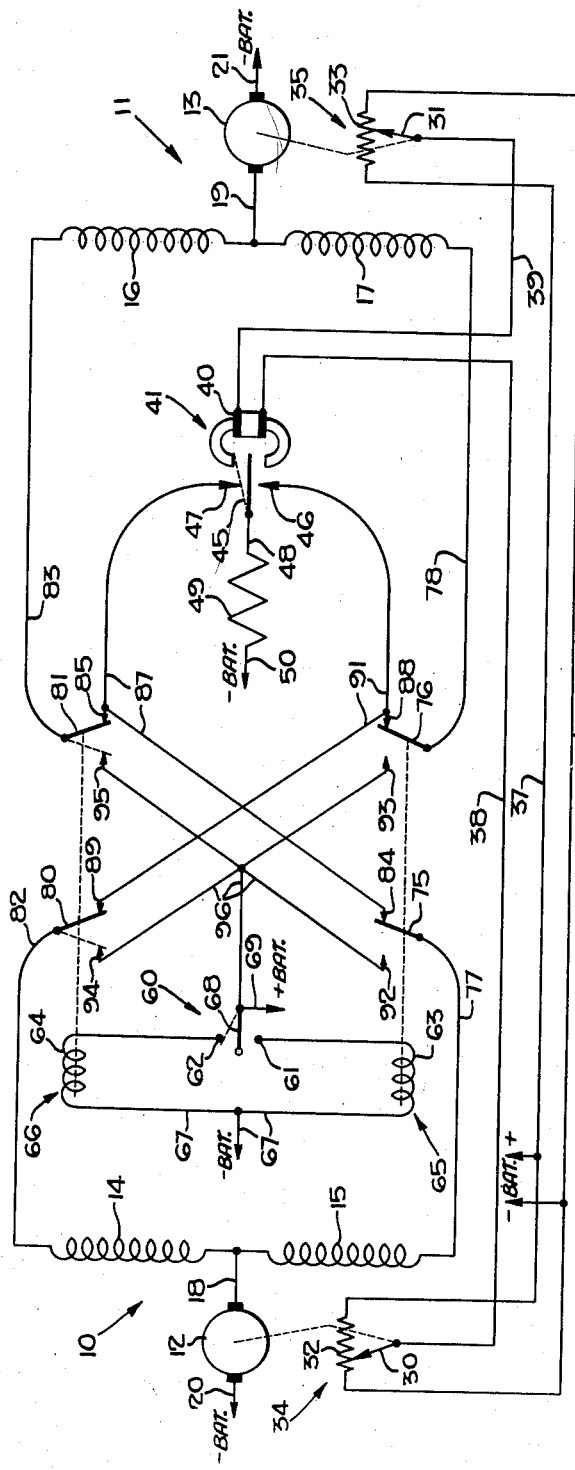
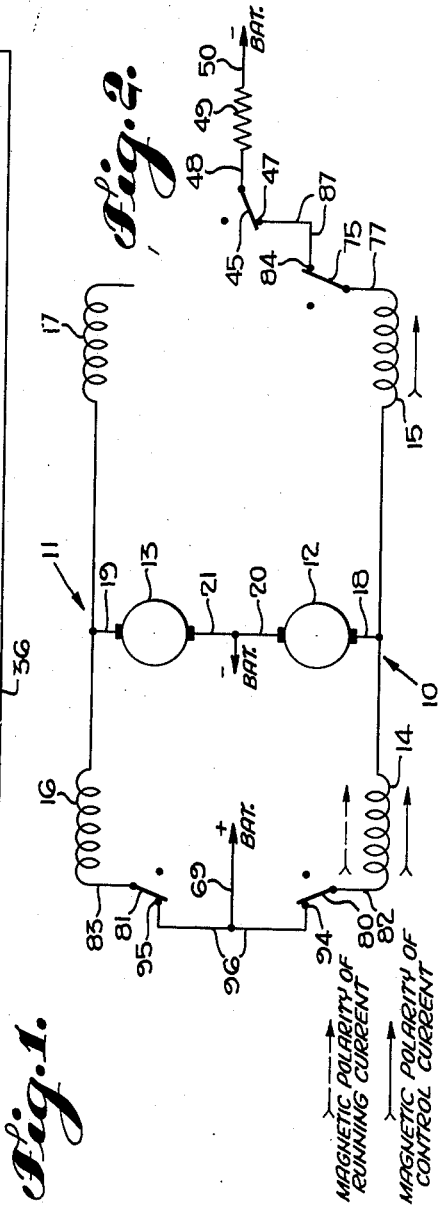

2,673,317

UNITED STATES PATENT OFFICE 2,673,317

SYNCHRONIZING MEANS FOR DIRECT-CURRENT MOTORS USING TWO FIELD WINDINGS

Frederick J. Nichols, Los Angeles, and Raymond T. Dowd, Hermosa Beach, Calif., assignors to The Garrett Corporation, Los Angeles, Calif., a corporation of California Application April 6, 1949, Serial No. 85,766

14 Claims. (Cl. 318—73)

Our invention relates to electric synchronizing systems in general, particularly relating to systems for achieving in-step synchronism between the rotations of a plurality of electric motors having series fields, the motors being either of the straight series type or of the compound wound type.

An object of this invention is to provide control means whereby the numbers of revolutions made by a plurality of such motors is maintained substantially proportional. A proportionality of 1:1 will be generally discussed in this specification, it being recognized that any proportionality is within the scope of the invention. Also, since running time of a plurality of motors being maintained in synchronism is a constant as between the motors, it will simplify the description to refer generally to motor speed or R. P. M., it being recognized at all times that proportionality of numbers of revolutions is the end attained where synchronism is desired.

In aircraft control applications it is generally required that the motors be of the bi-directional type. For this purpose motors have been designed with two electromagnetic field windings, one being used for clockwise rotation and the other field for rotation counter-clockwise. It is seen that when one field is being utilized for motor rotation in one direction, the other field is idle. It is an object of this invention to utilize the idle field for motor speed control.

It is another object to provide switching means for introducing current into the idle field or fields of a plurality of motors for providing substantial synchronism of operation of the motors.

Conventional motor synchronizing control circuits are usually predicated on the "master and slave" arrangement; that is, one controlling master motor or control always dictates synchronizing effects to the controlled slave motors. Our invention has for an object a synchronizing system wherein the system is the master of a plurality of motors and any one motor becoming asynchronous becomes the slave of the system until such time as the motor again becomes synchronized with the system.

It is another object to provide a motor speed control and/or a synchronizing system wherein the current increment fed into the idle field or fields for control is of moderate amount compared to the total draw of the motor or motors.

It is another object to provide a control system of the type described which will work with motors of either the saturated or unsaturated type.

It is another object to provide a system wherein the extent of departure of any one motor from synchronism dictates the extent of the corrective action given to that motor.

It is another object to provide a series field motor speed control which utilizes flux differentials within the motor to control its speed in a manner akin to the well-known shunt motor manner of speed control.

A system of the type described may be used in moving a pair of control surfaces of an aircraft. For example, dive brakes, trim tabs, ailerons, and other pairs of control surfaces must be moved uniformly with respect to each other else the aircraft may be subject to yaw, roll, and pitch forces of such character as cause the aircraft to deviate from the desired path. While our invention appears to have particular utility in connection with the control of airfoil surfaces, it is apparent that many other uses will immediately suggest themselves to those skilled in the art. Hence, it is not our intention to be limited to the system described herein as a preferred embodiment.

Referring to the drawings, wherein like reference characters designate like parts, Fig. 1 is a wiring diagram of a synchronizing system employing two series wound bi-directional motors for moving the ailerons of an aircraft;

Fig. 2 is a simplified schematic showing the essential connections made by the relays of Fig. 1 when one of the motors becomes asynchronous with the other.

Referring to Figure 1, there is shown a pair of electric motors 10 and 11 having armatures 12 and 13 and series fields 14 and 15, 16 and 17, respectively. Fields 14 and 16 accomplish rotation of armatures 12 and 13 in one direction and fields 15 and 17 accomplish rotation in the other direction. Conductors 18 and 19 serve to connect armatures 12 and 13 to the common leads of fields 14 and 15, and of fields 16 and 17, respectively, conductors 20 and 21 connecting the other sides of the armatures to one side of the power source as shown. The motors are integral components of actuators or other components (not shown) for moving aircraft ailerons or other devices (also not shown) between two extreme positions. Connected to the armatures 12 and 13 by suitable reduction gear means (not shown) are rotation displacement means, comprising the contactor arms 30 and 31 adapted to move variably across the resistor elements 32 and 33 of the potentiometers 34 and 35 respectively. Resistor elements 32 and 33 are connected to each other and to a battery or other current source by means of conductors 36 and 37, conductors 38 and 39 serving to connect contactor arms 30 and 31 in series with the winding 40 of normally open polarized relay 41. It is now seen that potentiometers 34 and 35, together with the associated current source and circuitry constitute an electrical bridge whose balance or unbalance is sensed by the relay 41.

Contactor arm 45 of relay 41 moves between fixed contacts 46 and 47 in accordance with impulses dictated by winding 40, arm 45 being connected through conductor 48 to a voltage dropping resistor 49, the other side of which is connected by a conductor 50 to the negative side of the power source.

A switch 60, which is placed convenient to the hand of the pilot, is provided for on-off and directional control of the motors 10 and 11. Fixed contacts 61 and 62 of the switch are connected to windings 63 and 64 of relays 65 and 66, the other side of the windings being joined by a common conductor 67 to the negative side of the power source. The movable contact 68 of the switch is connected by conductor 69 to the positive side of the power source. The relay 65 has movable contacts 75 and 76 connected to series fields 15 and 17 by means of conductors 77 and 78, respectively. The relay 66 has movable contacts 80 and 81 connected to series fields 14 and 16 by means of conductors 82 and 83 respectively.

Fixed contact 84 of relay 65 and fixed contact 85 of relay 66 are connected to fixed contact 47 of relay 41 by means of common conductor 87. In like manner, fixed contact 88 of relay 65 and fixed contact 89 of relay 66 are connected to fixed contact 46 of relay 41 by means of common conductor 91. The remaining fixed contacts 92 and 93 of relay 65 and contacts 94 and 95 of relay 66 are joined by a common conductor 96 to conductor 69 which leads to the positive side of the power source.

Assuming, for purposes of description, that the switch 60 is thrown to close contacts 68 and 62, as shown by the dotted line, relay 66 is energized to close contacts 80 and 94 and contacts 81 and 95, and to open contacts 80 and 89 and contacts 81 and 85, as shown by the dashed lines. Current then becomes available through conductors 69 and 96, contacts 94 and 80, and conductor 82 to winding 14 of motor 10; likewise, through conductors 69 and 96, contacts 95 and 81, and conductor 83, winding 16 of motor 11 is energized. With both motors running in synchronism, arms 30 and 31 of potentiometers 34 and 35 move in unison to maintain a balanced electric bridge across the resistors 32 and 33.

Assume now that motor 10 speeds up and thereby upsets the bridge balance. Current will then flow in conductor 38, winding 40 and conductor 39 in a direction such as to cause relay 41 to close contacts 45 and 47 as shown by the dashed line, thereby establishing a circuit from the negative side of the power source through conductor 50, resistor 49, conductor 48, contacts 45 and 47 of relay 41, conductor 87, contacts 84 and 75 of relay 65, conductor 77, windings 15 and 14 of motor 10, conductor 82, contacts 80 and 94 of relay 66, and conductors 96 and 69 to the positive side of the power source. This path of electricity creates two conditions within motor 10: (a) The increased current through the series field 14 (which is the running winding of the motor at the moment) causes an increased drop across that field with a subsequent decrease of voltage applied across armature 12; and (b) the direction of current in field 15 is such that the magnetizing force created thereby is aiding and in the same direction as that normally obtaining in field 14. Furthermore, since the current in the idle field 15 also flows through the running field 14 it is seen that the magnetomotive force created by the subsidiary or control current in the turns of field 15 is added to that of the same current in the turns of field 14; hence the control current has substantially double its magnetomotive effectiveness in one field alone.

Accordingly, the motor 10 slows down as a result of either or both of conditions (a) and (b) above. In the case of a motor of the saturated-field type it would seem that the slowing down of such a motor is probably due principally to the resultant lowered voltage applied across the armature, the increase of the flux due to the control current flowing in the two fields being only a minor amount if the flux density is well upon or past the knee of the B—H curve of the particular core materials when the motor is running under rated load. In the case of a motor which normally runs with an unsaturated field, it would appear that the added flux density due to the increased ampere-turns provided by the control current is a major factor in the resultant slowing down of that motor.

A feature of the system which is now apparent is that the amount of load on either of the motors 10 or 11 is of no consequence, it being possible to obtain synchronism between unequally loaded motors, one of which may be running under full load and the other under no load. Another feature is that failure of either motor does not affect the operation of the other. Likewise, even though one motor may be inherently faster than the other its operation is synchronized with the other. Also, it is not particularly necessary that the two motors be of the same size or approximately so, since the value of resistor 49 may be suitably compromised to provide control current to either of the idle series fields of motors of different powers. Also, anyone skilled in the art could devise a circuit having two or more dropping resistors of different values for the control of two or more motors of different power ratings if such procedure were deemed more feasible. Resistor 49 is not critical, as will be noted hereinafter.

It will be further noted that motor 10 in the above-mentioned assumptions does not merely slow down to the speed of motor 11 and then assume that speed. Motor 10 would seem to actually slow to a speed less than that of motor 11 until the departure from synchronism and resultant unbalance of the electrical bridge was corrected. At the instant the correction is made the bridge becomes balanced and current will cease to flow in winding 40 of relay 41, with a subsequent opening of contacts 45 and 47, resulting in opening the control circuit to the idle field 15. The motor then comes back to normal speed. This action will be more apparent when it is remembered that the invention functions to maintain the total number of revolutions made by each motor proportional in a given period of time.

Resistor 49 has utility in decreasing the current fed into field 15 in case the voltage of negative polarity applied to conductor 50 is the same as that applied to conductors 20 and 21. We have found if the current in field 15 is approximately 5% to 20% of that normally flowing in field 14 and armature 12 that satisfactory synchronizing control is achieved in certain applications of such motors to aircraft purposes. However, this range is not critical as to all applications and it is conceivable that a particular application might call for a control current in the idle field which is equal to, or more than, that which normally would flow in the running field and armature under specified or general load conditions.

The foregoing description has been concerned with an assumed case of motors 10 operating in one direction. Referring now to Fig. 1 it is seen that switch 60 may be thrown to select operation in the opposite direction, in which case series fields 15 and 17 will become the running windings and fields 14 and 16 will become idle fields which may be used for control purposes as aforesaid. Likewise, an assumption was made that polarized relay 41 was activated by the speeding up of motor 10 in such manner as to cause control current to be fed into the idle field of that motor. It is readily seen that the coaction of relays 41, 65 and 66 in accordance with the position of switch 60 and the direction of current flowing in winding 40 of relay 41 provides a flexible system wherein either motor which speeds up or departs from synchronism is slowed down or brought back to synchronism, regardless of the direction of rotation at the moment of departure. Likewise, if one of a pair of motors slows down due to an added load, for example, the other motor will likewise slow down to synchronous speed.

There may be applications in which it is desired to speed up the slower one of a plurality of motors to be synchronized. By interchanging the leads 38 and 39 of Fig. 1 with respect to winding 40 of relay 41, and also by applying a positive polarity to conductor 50 instead of the negative polarity shown in Figs. 1 and 2, the resulting circuit will provide a control in which the slower of the motors is controlled in such manner as to speed it up.

In such a case, referring to motor 10 of Fig. 2, the magnetic polarity arrows of the control current are reversed in effect and the magnetomotive force of the control current will buck instead of aid the magnetomotive force of the running current, the resultant field strength being thereby diminished. Since the control current will now flow through the armature instead of the running field, there will be an effective increase of voltage applied across the armature. Either of these resulting conditions or the combination of both will cause the motor 10 to speed up.

While we have described our invention with respect to the synchronizing of two bi-directional series motors, it will be apparent to those skilled in the art that the invention may be applied to the synchronizing of more than two motors. Also it will be apparent that the speed or rotational displacement of a single motor may be manually or automatically controlled by an application of the principles of our invention to that motor. Likewise it is apparent that motors of other than the bidirectional series type may be suitably controlled, hence we do not limit our invention to the specific embodiment shown and described.

We claim:

1. The combination of an electric motor with speed control means and a control current source, said motor having an armature and a running field for operation thereof, and further having a speed control field normally disconnected from said control current source, said speed control means comprising switch means rendered operative by deviation of said motor from desired speed to connect said control field to said control current source.

2. The combination of an electric motor with speed control means and a control current source, said motor having an armature and a running field for operation thereof and further having a speed control field normally disconnected from said control current source, said speed control means comprising switch means rendered operative by deviation of said motor from desired speed to connect said control field to said control current source, and further rendered operative by return of said motor to desired speed to disconnect said control field from said source.

3. The combination of an electric motor with speed control means and a control current source, said motor having an armature and a running field for operation thereof, and further having a speed control field normally disconnected from said control current source, said speed control means comprising switch means rendered operative by deviation of said motor from desired speed to connect said control field to said control current source whereby the magnetic flux set up in said control field by said control current tends to change the flux of the running field.

4. The combination of an electric motor with speed control means and a control current source, said motor having an armature and a running field for operation thereof, and further having a speed control field normally disconnected from said control current source, said speed control means comprising switch means rendered operative by deviation of said motor from desired speed to connect said control field to said control current source whereby the current in said control field tends to change the voltage applied across said armature.

5. A speed control for an electric motor, said motor having a pair of fields, either of which may be energized from a power source as a running field and the other then being simultaneously an idle field, comprising: a control current source normally disconnected from said idle field; switch means for connecting said control current source to either of said fields; and means to actuate said switch means at any operational point of said motor to supply said control current to whichever field is idle when the other field is energized as the running field.

6. The invention of claim 5 further characterized in that said motor is of the bi-directional type wherein energization of one of said fields by said power source causes rotation of said motor in one direction and energization of the other of said fields by said power source causes rotation of said motor in the other direction.

7. The invention of claim 5 further characterized in that said power source and said control current source are common.

8. The invention of claim 5 further characterized in that said means to actuate said switch means comprises a motor speed responsive means.

9. A synchronizing system for a plurality of electric motors having running fields and armatures, comprising: a control field in each of said motors; a control current source normally disconnected from said control fields; rotation displacement means associated with said motor armatures for detecting asynchronism of the rotations of said armatures; and switch means adapted to be operated by said rotation displacement means upon occurrence of asynchronism to connect said control current source to the control field of any one of said motors which becomes asynchronous with the system.

10. The invention of claim 9, further characterized in that the application of the current supplied to said control field tends to change the flux density in said running field.

11. The invention of claim 9, further characterized in that the application of the current supplied to said control field tends to change the voltage applied across said armature.

12. A synchronizing system for a plurality of electric motors, each of said motors having an armature and a pair of fields, one of the fields of each of said motors being energizable from a power source, the other field of each of said motors thereupon being an idle field, comprising: a control current source normally disconnected from said idle fields; rotation displacement means associated with said motors for detecting asynchronism of the rotations of said armatures; and switch means adapted to be operated by said rotation displacement means upon occurrence of asynchronism to connect said control current source to the idle field of any one of said motors which becomes asynchronous with the system.

13. The invention of claim 12, further characterized in that the application of the current supplied to said idle field tends to change the flux density in said running field.

14. The invention of claim 12, further characterized in that the application of the current supplied to said idle field tends to change the voltage applied across said armature.

FREDERICK J. NICHOLS.
RAYMOND T. DOWD.

References Cited in the file of this patent
UNITED STATES PATENTS

| Number | Name | Date |
|---|---|---|
| 1,063,608 | Shaw et al. | June 3, 1913 |
| 1,698,288 | Winne | Jan. 8, 1929 |
| 2,426,488 | Davidson | Aug. 26, 1947 |
| 2,428,403 | Yardeny | Oct. 7, 1947 |
| 2,443,657 | King | June 22, 1948 |
| 2,512,378 | Puchlowski | June 20, 1950 |